United States Patent
Jan

[11] Patent Number: 6,134,827
[45] Date of Patent: Oct. 24, 2000

[54] MOLE CHASER

[76] Inventor: Te-Chin Jan, 24F-1, No. 161, Sungteh Rd., Taipei, Taiwan

[21] Appl. No.: 09/362,557

[22] Filed: Jul. 28, 1999

[51] Int. Cl.⁷ .................................................... A01M 1/20
[52] U.S. Cl. ............................................................... 43/124
[58] Field of Search ........................... 43/124; 367/139; 116/22 A; 340/384.7

[56] References Cited

U.S. PATENT DOCUMENTS

| | | | |
|---|---|---|---|
| 5,205,066 | 4/1993 | Jan | 43/124 |
| 5,224,438 | 7/1993 | Buss | 116/22 A |
| 5,241,777 | 9/1993 | Looker | 43/124 |
| 5,822,917 | 10/1998 | Jan | 43/124 |
| 5,832,657 | 11/1998 | Jan | 43/124 |
| 5,870,847 | 2/1999 | Hsiao | 43/124 |
| 6,000,169 | 12/1999 | Jan | 43/124 |

*Primary Examiner*—Kurt Rowan
*Attorney, Agent, or Firm*—Dougherty & Troxell

[57] ABSTRACT

An improved mole chaser includes a rotation block eccentrically mounted on a motor spindle. The rotation block includes a loosely held impact ring which may hit an impact member housed in the battery chamber when motor rotates to generate an audio vibration frequency. The eccentrically rotation of the rotation block will generate another and additional audio vibration frequency to augment the moles and other underground burrowing rodents chasing effect.

5 Claims, 6 Drawing Sheets

MOLE CHASER

BACKGROUND OF THE INVENTION

1. Field of the Invention

This invention relates to an improved mole chaser and particularly to a mole chaser that has an eccentric rotational vibration means to generate audio vibration and additional vibration by the eccetrically rotating impact member to create better effect to expel moles and other rodent animals.

2. Description of the Prior Art

Conventional mole chasers generally employ electronic or mechanical means to generate audio vibration to chase moles away. FIG. 1 illustrates one of such examples disclosed in U.S. Pat. No. 5, 822,917.

It includes a main stem A, a rotation vibrating means B, a cap C, a battery chamber D and a control circuit E.

In front of the battery chamber D, there is a separating wall J set between an impact member F and an open slot I. The impact member F is a substantially hollow tube with a plural number of convex bulges H formed in the inside wall and with the separating wall J at the bottom. The separating wall J has a spindle opening K in the center and a pair of spaced apertures L located on two opposite sides of the spindle opening K. A motor M is fixed to the separating wall L by means of a pair of screws R through the apertures L. The motor M has a spindle Q running through the spindle opening K. Therefore the motor M is located in the open slot I on one side of the separating wall J while the spindle Q is located on another side of the separating wall J.

The rotation vibration means B includes the motor M, a rotation block N fixedly attached to the motor spindle Q, a pair of doughnut-shaped rings B and a pair of pins G for holding the rings D in two spaced second slots S of the rotation block N. Each ring P has a center opening U which has a large diameter than the outside diameter of the pin G. Each pin G is held firmly on the rotation block N through a pair of apertures T. When the control circuit E activates the motor M, the motor spindle Q and the rotation block N will be rotated. The rings P held in the second slots S will be moved outward because of centrifugal force, and thus hitting the convex bulges H and generating audio vibration. As the ring P is doughnut-shaped and curved, and is moved outward by centrifugal force, the ring P will bounce back once hitting the convex bulges H. Therefore both the rings P and the bulges H will not be damaged. The service life of the rings P and the bulges H thus will not be negatively impacted. A strong vibration and audio frequency will be generated through the main stem A.

Since the motor M rotates at a constant speed, the audio frequency generated by rotating rings P hitting the bulges H is relatively constant and has little variation. The ensuing mole chasing effect is thus limited.

SUMMARY OF THE INVENTION

It is an object of this invention to provide an improved mole chaser that is able to produce a variety of different audio vibrations to achieve more effective mole chasing functions.

The mole chaser according to this invention has an improved vibration block. The spindle opening in the vibration block for engaging with the motor spindle is eccentrically located. Therefore when the motor rotates and drive the rotational block to hit the impact member, additional vibration resulting from the eccentrical rotation of the rotation vibrating means will be generated besides the impacted audio vibration. More and different type of audio frequency thus will be produced to augment the mole chasing effect.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
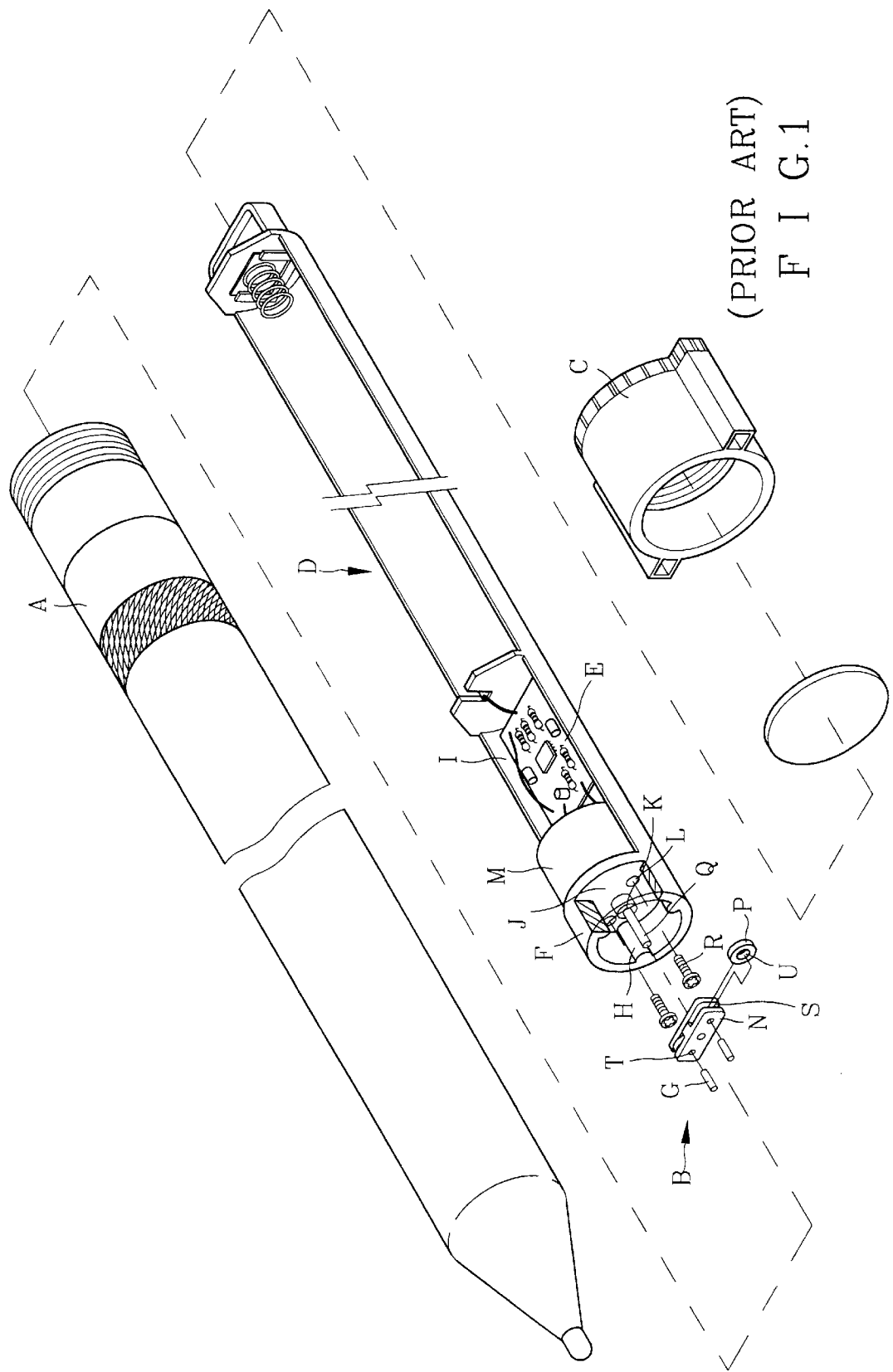
FIG. 1 is a perspective exploded view of a conventional mole chaser.
Figure 2:
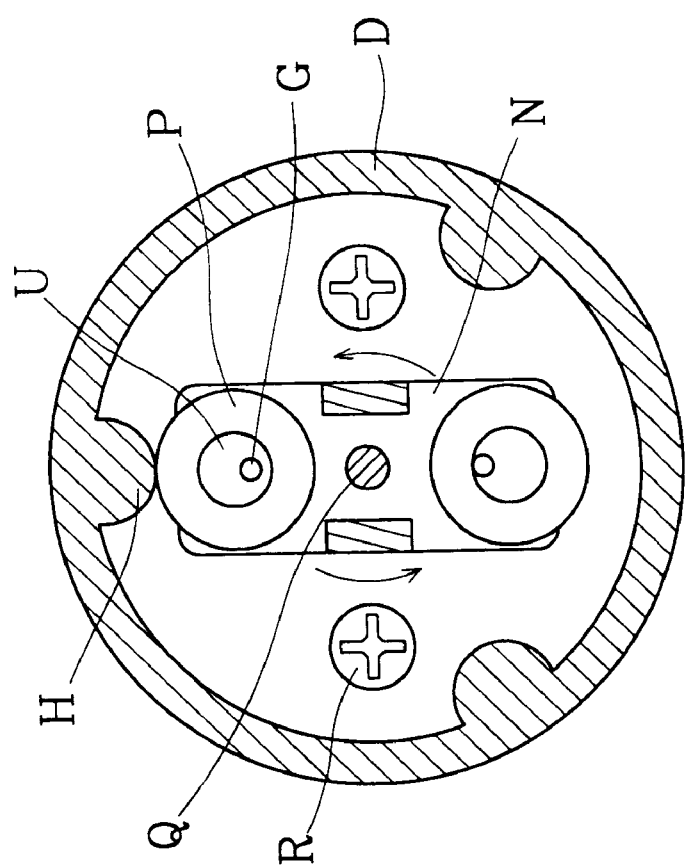
FIG. 2 is a cross-sectional view of the mole chaser shown in FIG. 1.
Figure 3:
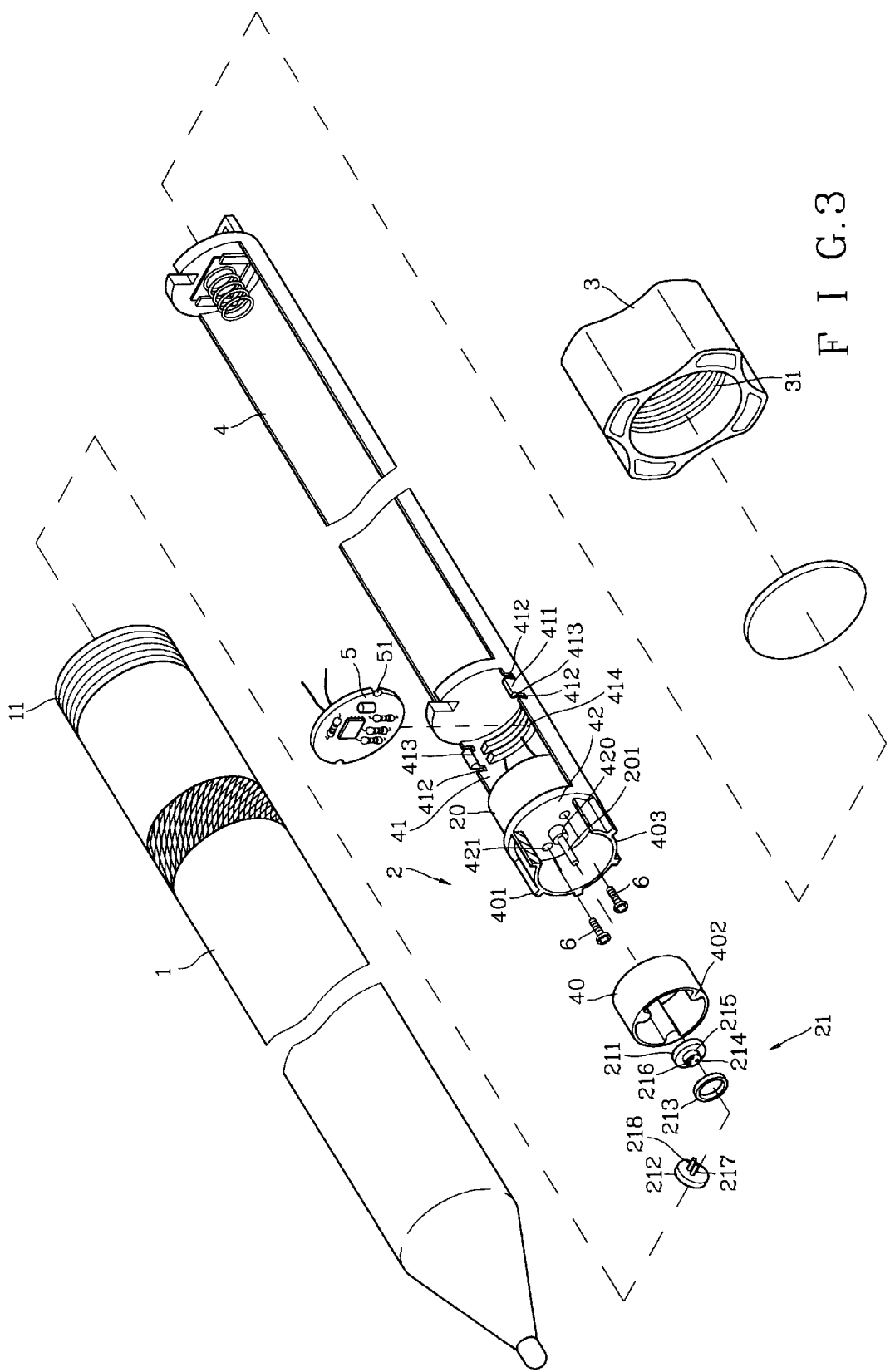
FIG. 3 is a perspective exploded view of this invention.
Figure 4:
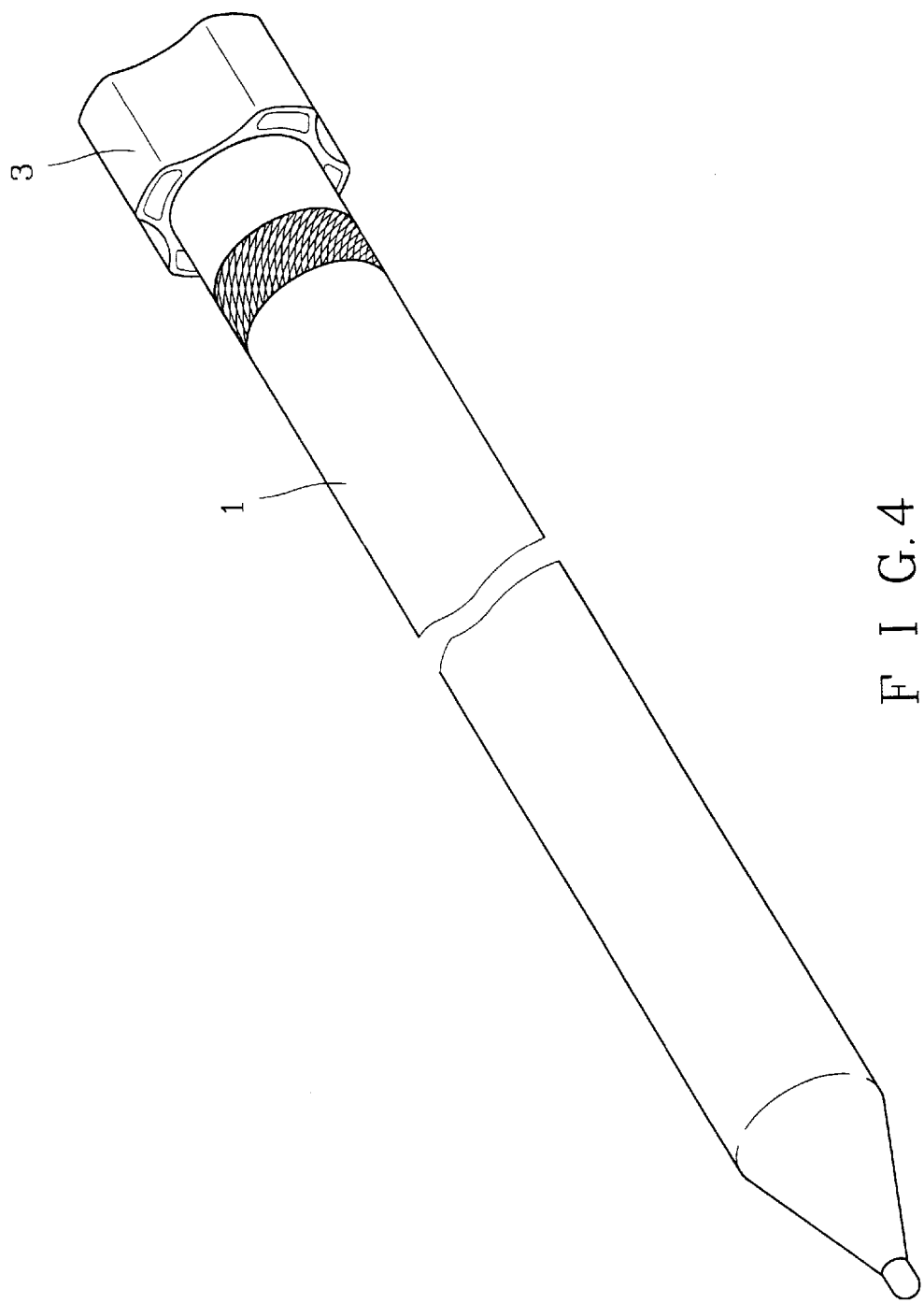
FIG. 4 is a perspective view of this invention.

Referring to FIG. 3, this invention includes a main stem 1, a rotation vibrating means 2, a cap 3, a battery chamber 4 and a control circuit board 5. The main stem is a hollow tube which has an opening end with external screw threads 11 for engaging with internal screw threads 31 formed in the cap 3. The battery chamber 4 has a tubular front section 403 which has a plurality of longitudinal ribs 401 formed on outside wall for engaging closely with inside wall of the main stem 1. The tubular front section 403 houses therein another tube type impact member 40 which has a plurality of curved bulges 402 longitudinally formed on the inside wall thereof. Behind the impact member 40, the battery chamber 4 has an open trough 41 which has a separating wall 42 to border with the impact member 40. A motor 20 is mounted on the separating wall 42 in the trough 41. Motor spindle 201 runs through an opening 420 at the center of the separating wall 42.

Figure 5:
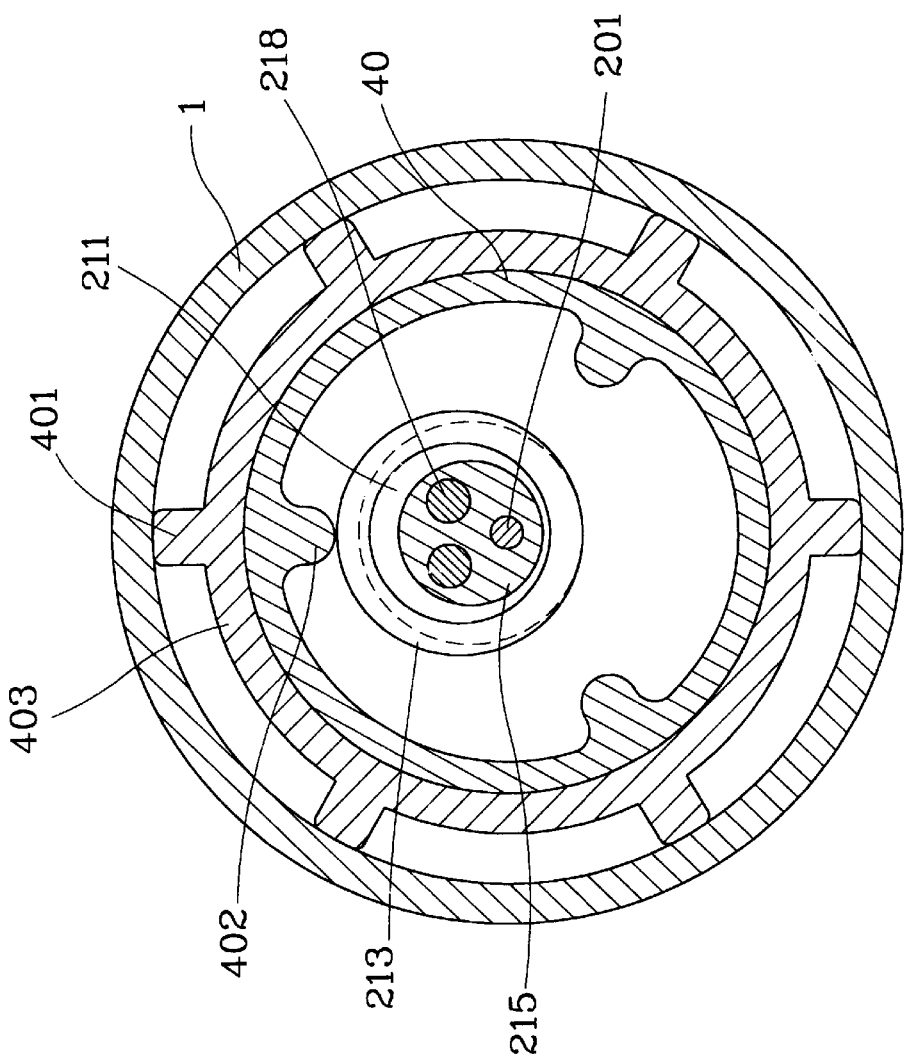
FIG. 5 is a cross-sectional view of a rotation vibrating means of this invention.

The vibrating means 2 includes the motor 20 and a rotation block 21 fixedly mounted on the spindle 201. The rotation block 21 includes a base 211, an impact ring 213 and a lid 212. The base 211 has a first spindle bore 214 for fixedly engaging with the motor spindle 201, a step section 215 which has a small diameter to enable the impact ring 213 loosely hanging over it (also shown in FIG. 5), and a pair of spaced bores 216. The lid 212 has a second spindle bore 217 for fixedly engaging with the motor spindle 201 and a pair of spaced struts 218 for fixedly engaging with the bores 216 to make the impact ring 213 be able to freely rotate about the step section 215 without dropping out of the lid 212. The first and second spindle bores 214 and 217 are eccentrically located away from the center of the base 211 and the lid 212.

When in use, the motor spindle 201 drives the base 211 and the lid 212 to rotate. Because of centrifugal force, the impact ring 213 will be rotated and forced outward to hit the bulges 402 to produce audio vibration. The eccentric rotation of the impact ring 213 and the base 211 and the lid 212 will produce additional audio vibration different from the impact induced vibration set forth above. Hence this invention may produce different set of audio vibration frequency to scare away moles and rodents that are sensitive to different audio frequency and making this invention more effective and useful.

Figure 6:
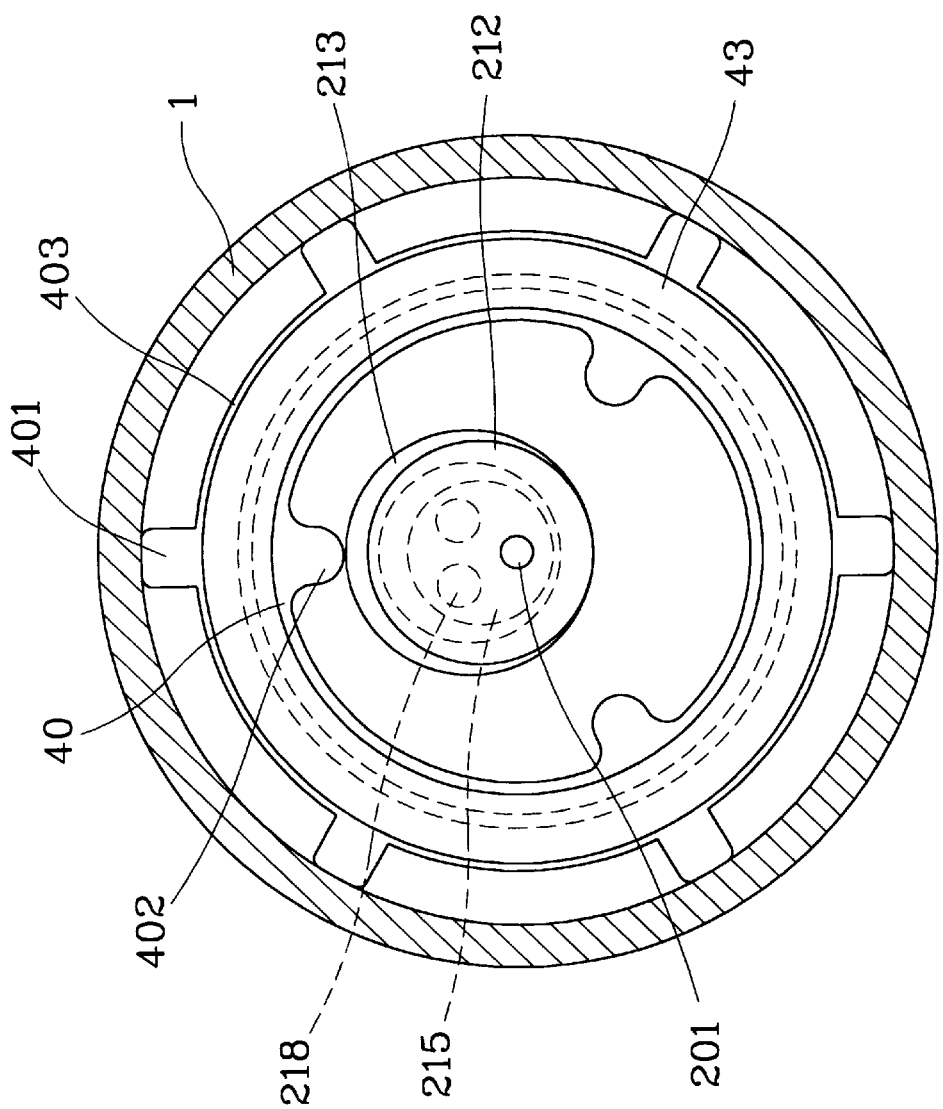
FIG. 6 is a cross-sectional view of another embodiment of this invention.

FIG. 6 illustrates another embodiment of this invention. The outside diameter of the impact member 40 is smaller than the inside diameter of the tubular front section 403 of the battery chamber 4. The impact member 40 is loosely held inside the tubular front section 403. The tubular front section 403 further has a stopper ring 43 adhered to or embedded at a front end thereof to prevent the impact member 40 from dropping out. When the motor 20 drives the impact ring 213 to hit the bulges 402, in addition to the impact and eccentrically rotation audio vibration set forth above, the loosely held impact member 40 will also generate extra audio vibration of different frequency to augment the mole chasing effect.

FIG. 3 also illustrates other structural improvement of this invention. The separating wall 42 has two spaced apertures 421 to receive screws 6 for fixing the motor 20 on the separating wall 42. On the two opposite side walls 411 of the trough 41, there are respectively provided with a pair of spaced notches 412 with a lug 413 located therebetween. At the bottom inside wall of the trough 41 corresponding with the notches 412, a pair of spaced ribs 414 are formed. The control circuit board 5 is substantially circular and has two opposite notches 51, and may be securely and speeding installed in the main stem by wedging the bottom edge between the ribs 414 and engaging the notches 51 with the lugs 413. Hence in addition to providing more effective mole chasing by generating a variety of different audio vibration frequency, this invention also offers simpler structure that can be made and maintained at a lower cost.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An improved mole chaser, comprising:

a tubular main stem having an open end with external screw threads formed thereon;

a cap having internal screw threads formed therein for engaging with the external screw threads of the main stem;

a battery chamber housed in the main stem having a tubular front section, a separating wall located at a rear end of the front section and a trough located behind the separating wall, the tubular front section containing an impact member which has a plurality of bulges formed on an inside wall thereof;

a rotation vibrating means including a motor mounted on one side of the separating wall and a rotation block located within the impact member, the rotation block including a base eccentrically engaged with a spindle of the motor, a lid spaced from and coupled with the base and being eccentrically engaged with the spindle, an impact ring loosely held between the base and the lid; and a control circuit board located in the trough to control the motor rotation;

wherein the motor rotation drives the impact ring hitting the bulges to generate an audio vibration frequency and also hitting the base and the lid to rotate eccentrically to generate another audio vibration frequency for forming a multi-frequency vibration.

2. The improved mole chaser of claim 1, wherein the base has a hole for holding the spindle of motor and a step section which has a smaller diameter than inside diameter of the impact ring for holding the impact ring thereon loosely and a plurality of spaced bores, the lid having a plurality of struts engageable with the bores of the base for preventing the impact ring from dropping out of the rotation block.

3. The improved mole chaser of claim 1, wherein the impact member is fixedly embedded in the front section of the battery chamber.

4. The improved mole chaser of claim 1, wherein the impact member is loosely contained in the front section of the battery chamber.

5. The improved mole chaser of claim 4, wherein the impact member has an outside diameter smaller than inside diameter of the front section, the front section of the battery chamber having a stopper ring fixedly located in front of the impact ring for preventing the impact ring from dropping out of the front section.

\* \* \* \* \*